UNITED STATES PATENT OFFICE.

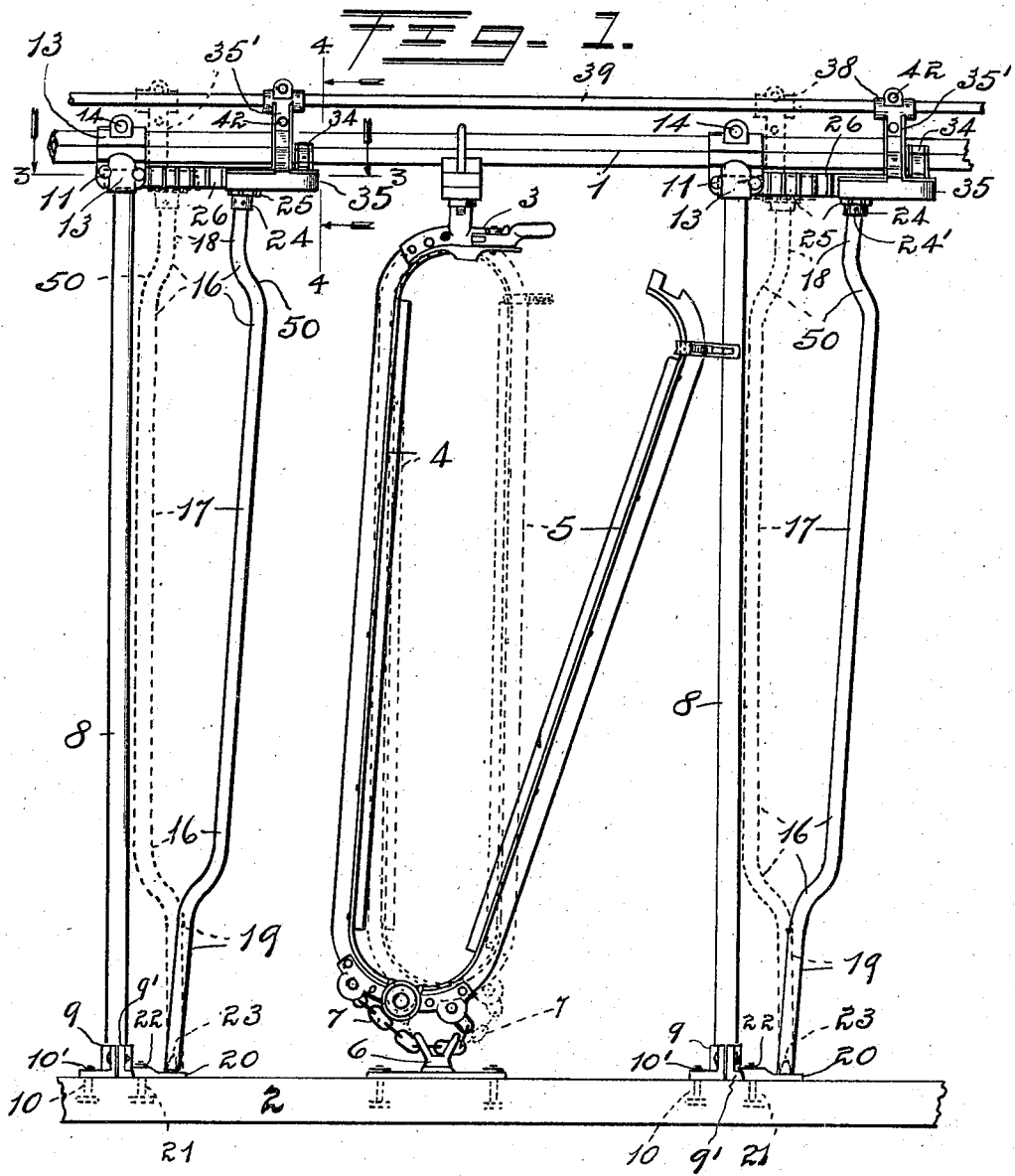

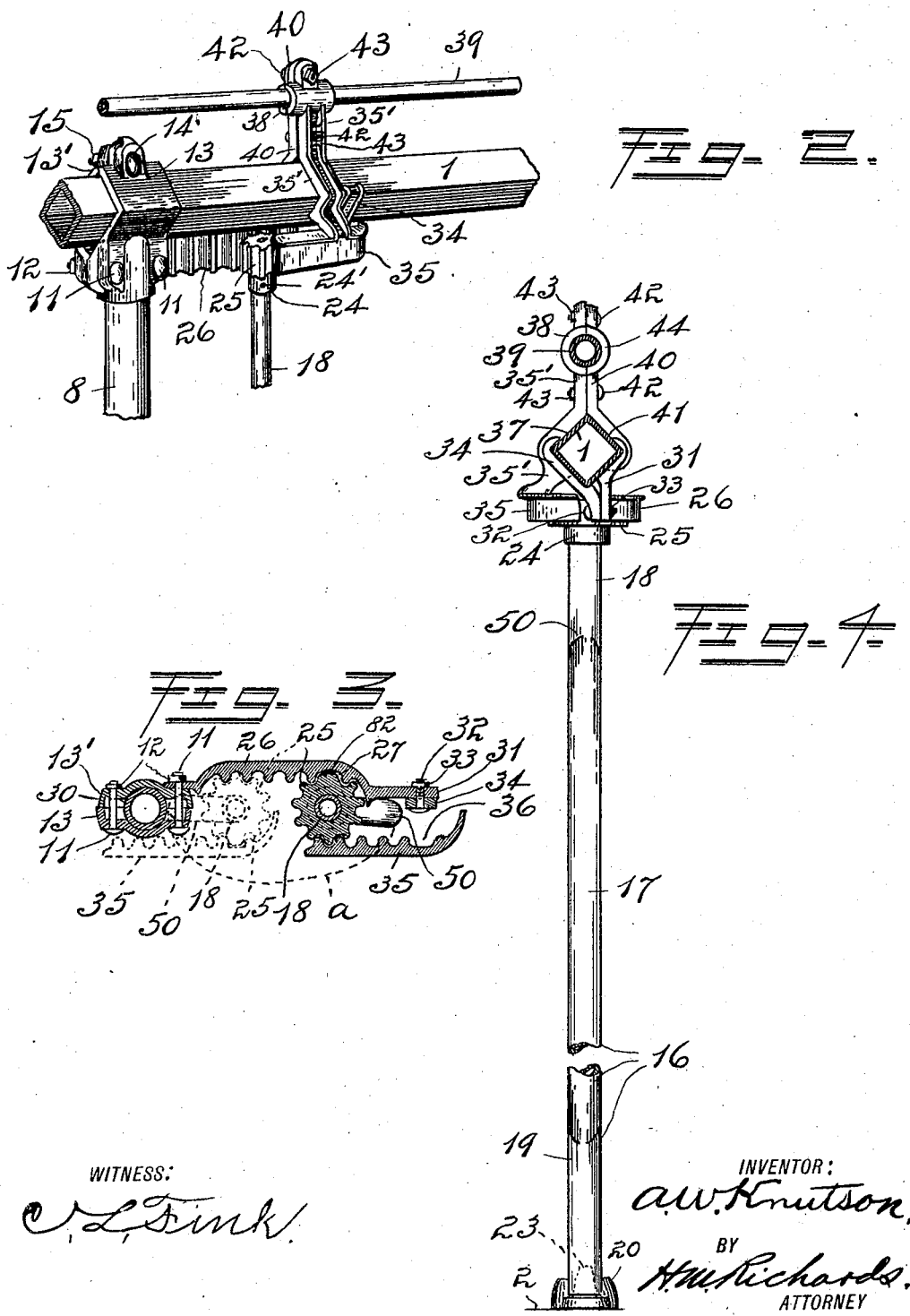

ALFRED W. KNUTSON, OF GALESBURG, ILLINOIS, ASSIGNOR TO ROWE MANUFACTURING CO., OF GALESBURG, ILLINOIS, A CORPORATION OF ILLINOIS.

STOP DEVICE FOR STALLS.

1,235,700. Specification of Letters Patent. Patented Aug. 7, 1917.

Application filed December 12, 1916. Serial No. 136,449.

*To all whom it may concern:*

Be it known that I, ALFRED W. KNUTSON, a citizen of the United States, and a resident of Galesburg, in the county of Knox and State of Illinois, have invented a new and useful Stop Device for Stalls, of which the following is a specification.

My invention relates in general to cattle-stalls equipped with stanchions. In the present-day type of stall some sort of device is provided whereby to so obstruct the space between the suspended member of the stanchion and the adjacent stall-post that the animal is practically forced to insert its head between the stanchion members, and the principal object of the invention, broadly stated, is to improve the construction and increase the utility and efficiency of devices of this nature.

When the relatively movable arm of a stanchion swings open its gravity will incline the lower end of the fixed arm in the opposite direction, if the stanchion be capable of laterally swinging movement. To provide a guard or, as it is known to the trade, a "sure-stop" which when in operative position will conform in inclination to said fixed stanchion arm, whereby to more effectively fill the space between said arm and the adjacent stall-post, constitutes a special object.

To so construct the sure-stop bar or tube that its lower end turns on a stud while its upper end moves cycloidally, constitutes another object.

To provide for connecting together a plurality of sure-stop or guard-bars (one in each stall) whereby they may be operated simultaneously, constitutes still another object.

To provide a novel foot for the guard-bar is an object.

It is an object to so construct the guard-bar and the means for operating it that when the animal is confined between the stanchion-arms the bar may be swung out of the way, whereby to permit the animal to freely swing its head from side to side, in order to lick itself, etc.

To dispense with links, couplings or the like, arranged close to and parallel with the floor, constitutes an object, for these catch on the bedding and litter and frequently fail to operate.

To equip a series of stalls with sure-stops which are so frictionless in operation that a large number thereof may be operated without the aid of levers or other power-increasing means, constitutes another of the objects.

To arrange the connecting and manipulating rail directly above the stall-frame rail (1), for purposes later herein described, constitutes still another object.

To so construct the coacting means which operate the "sure-stops" that it is practically impossible for a novice to place them in wrong positions relatively to the stop, is an object.

Numerous minor objects, some of which will be obvious and others of which will be specifically pointed out, will presently appear.

The nature of the invention is such that it will be readily understood by reference to the accompanying drawings and to the following specification, but it must be understood that said drawings and description disclose only that particular embodiment which I at present prefer and which has proven, in operation, to be practical, efficient and successful, and that the details are subject to much modification without departing from the principles and novel features of the invention defined in the claims, in which claims it is my intention to claim as broadly as is permitted by the state of the art, all the novelty inherent in the invention. In said drawings:

Figure 1 is a front elevation showing one complete stall and the sure-top or guard-bar of an adjacent one;

Fig. 2, an enlarged detail of the upper portion of the sure-stop, the mechanism for operating it, and other portions of the stall;

Fig. 3, an enlarged sectional detail, its plane taken in the line 3—3 in Fig. 1; and Fig. 4, a transverse section, taken in the line 4—4 in Fig. 1, most of the parts shown in end elevation.

Considering the drawings in detail and referring to the elements and, where necessary, each by a distinguishing numeral, uniformly employed, 1 designates the usual stanchion-supporting rail; 2 the stall-floor; 3, a stanchion-head secured to the rail 1; 4 a stanchion-arm fixed to the head 3; 5, a coacting stanchion-arm hinged at its lower end to the arm 4 and its upper end adapted for engagement with the head 3; 6, a yoke swiveled in the floor 2; 7, a chain connecting the stanchion-arms therewith; and 8, 8, stall-posts secured at their lower ends by clips 9, 9', bolts 10 and nuts 10' to the floor 2 and at their upper ends secured by bolts 11 and nuts 12 to clips 13, 13' secured by bolts 14 and nuts 15 to the rail 1. I make no claim herein to any of these elements *per se*.

My improved sure-stop or guide-bar 16 is preferably made of tubular metal and comprises a centrally arranged body portion 17 having an offset upper portion 18 and a similarly offset lower portion 19. Preferably the axes of the portions 18 and 19 are lineally arranged, and preferably the axes of the portions 17, 18 and 19 are substantially parallel. By thus offsetting the upper and lower ends from the median portion (or vice versa) the latter becomes a crank-arm whereby the sure-stop or bar may be rotated. 20 designates a foot secured rigidly to the floor 2 and clips 10' by means of a bolt 21 and nut 22. It is provided with a swivel-stud 23 on which seats the lower end of the guide-bar. The upper end of the bar is fixed by means of a hub 24 and pin 24' to an actuating pinion 25.

26 indicates a stationary rack having two of its teeth spaced farther from each other than are the others, as shown at 27, in order to receive in the greater space one enlarged tooth, 28, on the pinion 25. One terminal, 30, of said rack is secured by one of the bolts 11 to the clip 13' and its other terminal, 31, is projected upward, at a right angle to the rack-body, and has a groove in which one corner of the rail 1 seats. Secured to the projection 31 by a bolt 32 and nut 33 is a clip 34 whereby said rack is held rigidly upon the rail 1.

35 designates a sliding rack two teeth of which are spaced farther apart than are the others, as shown at 36. It has an upwardly extending arm 35' which is recessed at 37 to fit over a corner of the rail 1 and has also a semicircular recess 38 which fits over one side of a combined connecting and manipulating rail 39 which may extend over one or a plurality of stalls, as may be necessary or desired. 40 indicates an arm or bracket having a recess 41 which coacts with the recess 37, fitting over the opposite side of the rail 1. By means of bolts 42 and nuts 43 the members 35' and 40 are held securely together, but in such manner that the portions 37 and 41 may slide freely upon the rail 1. The arm 40 is provided also with a recess 44 which coacts with the recess 38, fitting over the opposite side of the rail 39. The bolts 42 and nuts 43 bind the recessed parts 38 and 44 closely upon the rail 39, whereby movement of said rail will move the rack 35 and vice versa.

In order that the sure-stop-bar be so positioned that when the stanchion arms are opened its body portion will lie substantially parallel with the arm 4, as shown clearly by full lines in Fig. 1, and that when the stanchion arms are closed it will lie close to and substantially parallel with the adjacent stall-post 8, as shown by the dotted lines in said figure, I have provided the indicating tooth 28 on the pinion 25, which tooth is to be positioned in the space 27 in the rack 26—the lower end of the stop 16 having been placed over the pivot stud 23 and its upper end secured to the pinion. The stop is then turned to the position shown by dotted lines in Fig. 1 and the tooth 28 positioned in the space 36, whereupon the several securing bolts and nuts are to be drawn up taut. The operator may operate the stop by means of either the rail 39 or by turning the bar itself, and it will be evident that when movement is imparted to either it will be transmitted to all the stops connected with the said rail. It is to be noted that no levers or other power-increasing elements are shown, for the friction of the moving parts is so minute that none are required, and the operator does not have to walk to a lever, but may grasp the rail 39 at any point along its length to thereby operate it, or he may, of course, operate that one of the stops nearest him and thereby operate all.

Also it is to be noted that the operating rail is placed directly above the stall-rail. Thus positioned not only is it extremely convenient of access but also it is not in the way either of the stableman or the animal.

The direction of movement of the diagonal portion 50 of the stop 16 is shown clearly by the dotted line *a* in Fig. 3, which shows it to move in a cycloidal manner. The foot of the stop rotates on the stud 23, and its head simultaneously rotates and moves laterally. The described manner of rotating the lower end of the stop on a stud I have found to be a very superior one, for there are no projecting arms or brackets which catch in the bedding and thus fail to operate, or at least to operate freely and effectively, and which are liable to breakage by reason of the cattle stepping on that end which is elevated from the floor. By rotating the upper and lower terminals of the stop and moving the former sidewise the stop will substantially parallel the inclined arm 4, and thus more completely close the gap between it and the post when the stanchion is opened, and will lie substantially parallel with the stall-post when the stanchion arms are closed, whereby to give the animal freedom of movement of its head. It will be clear also that the fact that the end portions of the stop are offset from its body or central portion permits it to lie closer to the opened stanchion, when desired, and to the stall-post when desired, than it would if it were free from bends.

The parts comprising my improvement may be sold as an attachment to a previously built stall of the nature disclosed, for the rod 39, the stop 16 and its operating parts, and the foot 20 may be attached, in an evident manner, by means of only the bolts and nuts 14—15, 32—33, and 42—43, to the previously set stall-members.

Having thus described the nature of my invention and having illustrated that embodiment thereof which is now preferred by me, I claim as new the following, to-wit:

1. Combined in stall equipment, a sure-stop bar having an offset portion, a reciprocatory pinion secured to said bar, a fixed rack traversed by the pinion, and means for holding the pinion in engagement with the rack.

2. Combined in stall-equipment, a sure-stop bar having an offset portion intermediate its ends, a pinion secured thereto, an element traversed by the pinion and a rack for moving the pinion laterally with reference to the stall.

3. Combined in stall-equipment, a sure-stop bar having an offset portion, a pinion secured to the bar, an element traversed by the pinion, and a rack for moving the pinion laterally with reference to the stall.

4. In stall-equipment, a sure-stop bar portions of which are offset from each other, and toothed means for simultaneously imparting to said bar both rotary and sidewise movement.

5. In stall-equipment, a sure-stop bar portions of which are offset from each other, and rack-and-pinion means for simultaneously imparting to said bar both rotary and sidewise movement.

6. In stall-equipment, a sure-stop bar portions of which are offset from each other, and means for moving a portion of said bar cycloidally.

7. The combination with a stall-post, a horizontally arranged frame-rail, and a stanchion connected to said rail, of a sure-stop bar arranged between said post and stanchion, a pinion secured to one of its ends, an element which said pinion is caused to traverse, and a rack adapted for coaction with said pinion whereby to move one end of said bar sidewise.

8. The combination with a stall-post, a horizontally arranged frame-rail, and a stanchion connected with said rail, of a sure-stop bar arranged between said post and stanchion, means on which its lower end may move, a pinion secured to its other end, an element which said pinion is caused to traverse, and a rack adapted for coaction with said pinion whereby to move the last recited end of the bar sidewise.

9. The combination with a stall-post, with a stanchion having arms jointed to each other at one end, and with means for engaging their other ends, one of said arms adapted to be inclined by the other when the arms are disengaged; of a sure-stop bar the main portion of which is adapted to be moved into substantial parallelism with that stanchion-arm which has been inclined as recited and into substantial parallelism with the stall-post when in another position.

10. The combination with a stall-post, with a stanchion the arms of which are jointed to each other, and with means for suspending one of said arms, the other arm adapted to throw the last recited arm into an inclined position when the arms are in position to admit the head of an animal; of a sure-stop bar the middle portion of which is adapted to be moved into substantial parallelism with the suspended stanchion-arm when it is in the inclined position recited and into substantial parallelism with the stall-post when in another position.

11. In stall-equipment, the combination with a transversely arranged frame-rail, a supporting post, and with a jointed-arm stanchion suspended from said rail and its suspended arm adapted to be swung into an inclined position when the stanchion is in position to admit the head of an animal, of a sure-stop bar the lower end of which is adapted for rotation only and the upper end of which moves sidewise, said bar lying, when moved in one direction, in substantial parallelism with said suspended stanchion-arm when it is inclined as stated, and lying, when in another position, in substantial parallelism with said post.

12. In stall-equipment, the combination of a stationary rack, a movable rack, a pinion interposed between them, an offset stop-bar secured at its upper end to said pinion, and means whereon the lower end of said bar is supported to move rotatorily but not laterally.

13. In stall-equipment, the combination of a stationary rack two teeth of which are separated farther from each other than are the others, whereby to provide an enlarged space, a pinion in engagement with said rack and having one of its teeth larger than the others and adapted to engage the space between the two teeth aforesaid means for imparting movement to the pinion, and an offset sure-stop-bar fixed to and operable by said pinion.

14. The combination with a transversely arranged stall-rail, of a rack fixed thereto, a rack slidably connected with said rail, a pinion engaged with both of said racks, and an offset sure-stop-bar secured to the pinion.

15. The combination with a transversely arranged stall-rail, of a rack fixed thereto, a rack slidably connected with said rail, a pinion engaged with said racks, an offset sure-stop bar secured to the pinion, and an operating-rod secured to the slidable rack.

16. In stall-equipment, the combination with a plurality of stall posts, with a rail arranged transversely of the stall, and with a plurality of stanchions; of a plurality of sure-stop bars each of which has an offset portion and each of which bars is disposed between one of said posts and one of said stanchions, and a pinion and means coöperating therewith for rotating and also for moving sidewise the upper portion of each bar whereby to bring it closer to or farther from the adjacent one of said posts for simultaneously moving all of said bars.

17. In a stall-equipment, the combination with a plurality of stall-posts, with a rail arranged transversely of the stall, and with a plurality of stanchions; of a plurality of offset sure-stop bars each of which is disposed between one of said posts and one of said stanchions, a rack-and-pinion mechanism operatively connected with each bar whereby to rotate it and to move one end thereof sidewise to bring it closer to or farther from the adjacent stall-post as desired, and means for simultaneously operating all of the rack-and-pinion mechanisms.

18. The combination with a stall-post and a stanchion, of a sure-stop bar having non-lineal portions, said bar arranged between said post and stanchion, means whereon the lower end of the bar is rotatorily mounted and for restraining it from displacement, and means for simultaneously rotating and moving sidewise the upper end of the bar.

19. In stall-equipment, a sure-stop rotatorily mounted at its lower end, and means for moving one of its portions cycloidally.

20. In stall-equipment, a sure-stop rotatorily mounted at its lower end, and means for simultaneously rotating and moving one of its portions cycloidally.

21. The combination with a transversely arranged stall-frame-rail, of a rack having a projection, a bracket adapted to coact with said projection, means for holding said projection and bracket together upon the rail, a rack having an arm slidable on the trail, a pinion operated by said racks, a sure-stop bar moved by the pinion, a clip coacting with the last recited arm, and means for securing the last recited arm and the clip together.

22. The combination with a transversely arranged stall-frame-rail, of a rack having a projection, a bracket adapted to coact with said projection, means for holding said projection and bracket together upon the rail, a rack having an arm slidable on the rail, a pinion operated by said racks, a sure-stop bar operated by the pinion, a clip coacting with the last recited arm, means for securing the last recited arm and the clip together, and a slidable rod to which the slidable arm and the clip are fixed.

23. In stall-equipment, a stanchion-supporting rail, a rack supported adjacent it, an element slidable along the rack, a pinion connected thereto and held thereby in engagement with said rack, and a sure-stop bar having an offset portion to which both lateral and rotatory movements are imparted by the pinion.

24. In stall-equipment, a sure-stop bar having an offset intermediate portion, said bar rotatorily mounted at its lower end, and means for moving said offset portion cycloidally.

25. In stall-equipment, a sure-stop bar the median portion of which is offset from its end portions, and means for moving said offset portion cycloidally.

26. In stall-equipment, a sure-stop bar having end portions both of which are rotatorily mounted, and having an intermediate portion offset from the end portions, and means for imparting cycloidal motion to said intermediate portion.

27. In stall-equipment, a sure-stop bar comprising ends and an intermediate portion offset therefrom, and means for causing said ends to rotate, one of them also to move laterally, and the intermediate portion to move cycloidally.

28. In stall-equipment, the combination of a stationary rack, a movable rack, a pinion interposed between them, an offset sure-stop bar secured at its upper end to said pinion, and means whereon the lower end of said bar is held from lateral movement.

In testimony whereof I hereunto affix my signature this 9th day of November, 1916.

ALFRED W. KNUTSON.

Copies of this patent may be obtained for five cents each, by addressing the "Commissioner of Patents, Washington, D. C."